US006867785B2

United States Patent
Smith

(10) Patent No.: US 6,867,785 B2
(45) Date of Patent: Mar. 15, 2005

(54) METHOD AND SYSTEM FOR DETERMINING RESOLUTION AND QUALITY SETTINGS FOR A TEXTURED, THREE DIMENSIONAL MODEL

(75) Inventor: Joshua Edward Smith, Barre, MA (US)

(73) Assignee: Kaon Interactive, Inc., Maynard, MA (US)

(*) Notice: Subject to any disclaimer, the term of this patent is extended or adjusted under 35 U.S.C. 154(b) by 195 days.

(21) Appl. No.: 10/187,660

(22) Filed: Jul. 1, 2002

(65) Prior Publication Data

US 2003/0039408 A1 Feb. 27, 2003

Related U.S. Application Data

(60) Provisional application No. 60/302,571, filed on Jul. 2, 2001, and provisional application No. 60/315,485, filed on Aug. 28, 2001.

(51) Int. Cl.[7] .................................................. G09G 5/00
(52) U.S. Cl. ....................................... 345/582; 345/698
(58) Field of Search ................................. 345/582, 600, 345/603, 698, FOR 147, 192, 211; 382/166, 236, 237, 239, 242–248, 254

(56) References Cited

U.S. PATENT DOCUMENTS

| 6,125,201 A | * | 9/2000 | Zador .......................... 382/166 |
| 6,452,602 B1 | * | 9/2002 | Morein ........................ 345/555 |
| 6,654,023 B1 | * | 11/2003 | Peterson ..................... 345/587 |
| 2002/0009232 A1 | * | 1/2002 | Sodagar et al. ............. 382/232 |

* cited by examiner

Primary Examiner—Matthew C. Bella
Assistant Examiner—G. F. Cunningham
(74) Attorney, Agent, or Firm—Law Office of Brett N. Dorny

(57) ABSTRACT

The present invention relates to a system and method for determining quality or resolution settings for encoding a three dimensional model within a desired size budget. The system allows the user to select or change the size budget and either the quality settings or resolution settings. The system, applying the method of the invention, then determines the resolution or quality settings for each image in the model so as to meet the size budget. The user may also lock certain settings so that they are not changed by the system when other modifications are made by the user.

11 Claims, 4 Drawing Sheets

METHOD AND SYSTEM FOR DETERMINING RESOLUTION AND QUALITY SETTINGS FOR A TEXTURED, THREE DIMENSIONAL MODEL

CROSS-REFERENCE TO RELATED APPLICATIONS

This application claims the benefit of priority to U.S. Provisional Applications Ser. Nos. 60/302,571 and 60/315,485, filed Jul. 2, 2001 and Aug. 28, 2001, respectively, which are incorporated herein by reference in their entirety.

STATEMENT REGARDING FEDERALLY SPONSORED RESEARCH

Not applicable.

REFERENCE TO MICROFICHE APPENDIX

Not applicable.

BACKGROUND OF THE INVENTION

The present invention is directed toward a system and method for encoding textured, three dimensional models of objects. In particular, it relates to a system and method for adjusting encoding of textures in the textured, three dimensional model in order to achieve objectives as to model size.

The creation of high quality three dimensional models is generally done in two phases. First, a high quality "reference version" of the three dimensional model is created. Various techniques, such as utilization of CAD programs, laser scanning of real objects and analysis of photographs, are used to create the reference version. This reference version typically does not place particular constraints on the size of the model or the resulting file size. Thus, the reference model is created with the objective of best representing the actual object to which the model applies. Second, the textures and geometry of the reverence version of the model are reduced in quality, in order to create a model within a particular file size budget or constraint.

A size budget is generally determined by external influences, such as a maximum tolerable download time or the amount of available memory in the rendering environment. The faster the required download time, the smaller the size budget must be. Of course, as quality is reduced, to achieve a smaller size budget, the appearance of the rendered model is less representative of the original object. A need exists for a process and system for balancing the inherent tradeoffs between the size and quality aspects images.

Most image manipulation software packages include a tool, often referred to by skilled artisans as the "Save for Web" feature, that allows a user to balance the tradeoffs between image quality and size or download speed. Such standard tools operate on a single image at a time. Many users desire to perform quality balancing on many images simultaneously. Therefore, a need exists for a system and process for balancing the tradeoffs between the size and quality aspects of multiple images simultaneous.

Furthermore, a three dimensional model is formed of a number of images representing textures for different portions of the model. Using a single quality setting for compressing all of the images simultaneously will often give undesirable results. It is often the case that some images are more important in a particular model. If, for example, a user desires to create a three dimensional model of a radio, she may determine that retaining detail for the display area is important, while details of the sides of the radio could be dispensable. Therefore, a need exists for a system and process which allows a user to use different quality settings for different images in a model. Furthermore, a need exists for a system and process which allows a user to see how adjustments in the scale or quality of one image impact the quality of the other images when constrained to a constant size budget.

SUMMARY OF THE INVENTION

The present invention is directed toward a system and method that enables a user to separately choose resolution and compression quality settings for each of the texture images in a three dimensional model which is subject to a size budget. According to an aspect of the present invention, a user interface is provided for the user to select a size budget and relative resolution and quality settings. The system then processes the reference model based to determine actual quality and resolution values. The selected quality and resolution values are then applied to create a new three dimensional model, and the model is rendered and displayed for the user. The user can then change the size budget or relative quality or resolution values to adjust the appearance of the rendered model. When adjustments are made, the process of determining actual values, applying them and rendering the model are repeated.

According to another aspect of the invention, the user can "lock in" the values for certain images once those images are acceptable. Subsequent adjustments to selected values for other images will not change the values for the locked images. In this manner, the present invention allows the user to determine and set desirable quality and resolution values for an entire model which optimizes the size and appearance of the rendered model.

According to another aspect of the invention, the system may accept the quality settings as fixed and only automatically adjust the resolution settings to achieve the desired size budget. Alternatively, the system may accept the resolution settings as fixed and automatically adjust the quality settings. According to another aspect of the invention, the user interface provides sliders allowing the user to set values along a continuum. Alternatively, the user interface may provide several discrete possible values for user selection.

DETAILED DESCRIPTION

The present invention provides a system and method for allowing a user to interactively select a size budget for a three dimensional model and quality and resolution settings for individual images which are part of the three dimensional model. According to preferred embodiment, the present invention is implemented on a general purpose computer, such as a personal computer or server. The invention may be implemented on a stand alone computer or a computer on a network. The invention may operate through a local area, wide area or global network.

Furthermore, the invention may be implemented in any programming language. However, according to a preferred embodiment, the present invention is implemented in the JAVA programming language. The invention is described below with respect to the steps performed in the process and exemplary user interfaces. These descriptions are by way of example only. Those of ordinary skill in the art will readily recognize additional steps or interface features which could be programmed as part of the invention. The invention is not limited to any particular program, programming language or user interface.

Figure 1:
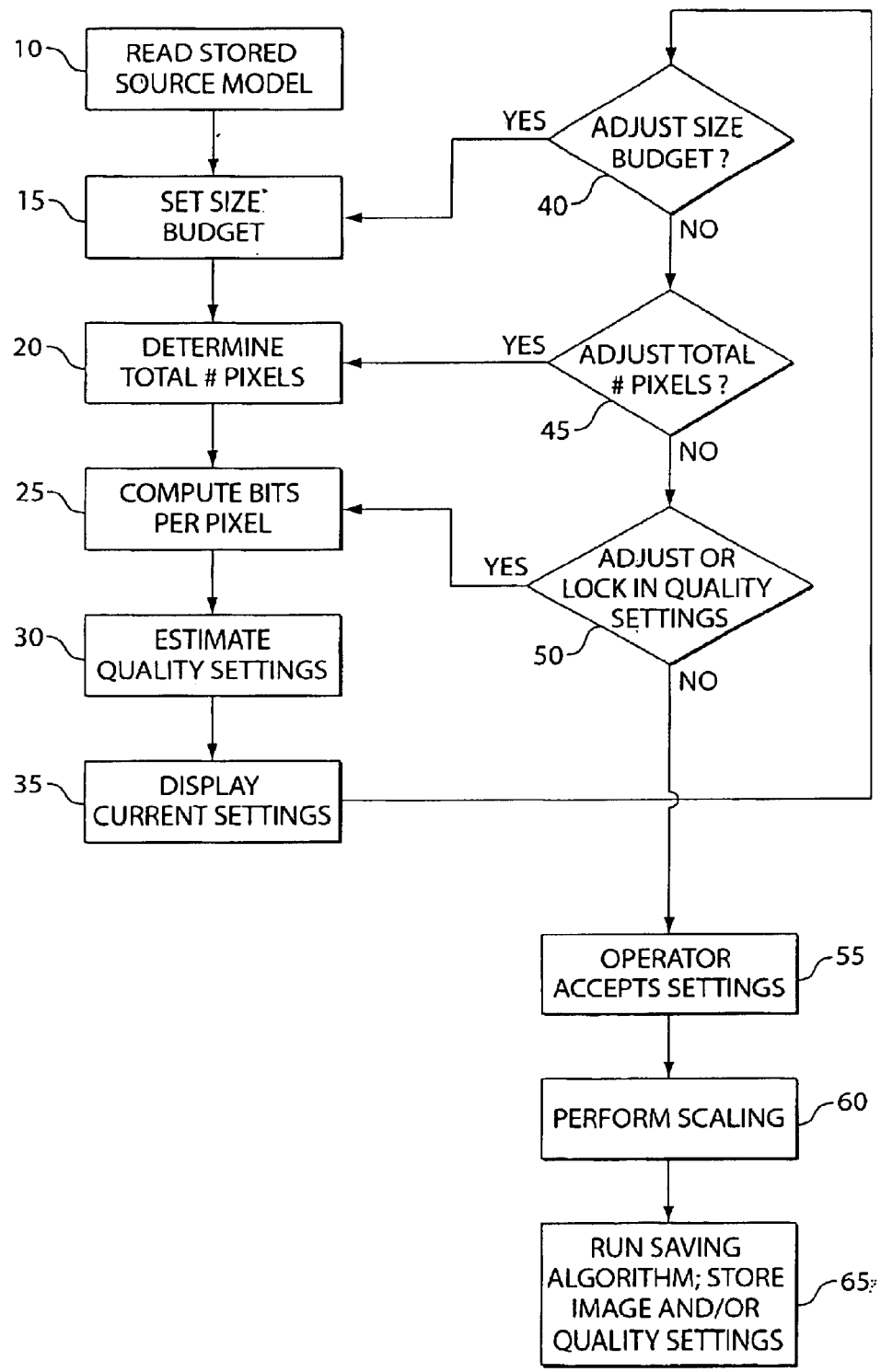
FIG. 1 is a block flow diagram of operation of a first embodiment of the present invention.

The process of a first embodiment of the present invention is illustrated in FIG. 1. The first step 10 in this embodiment of the invention is reading a stored, textured, three dimensional source model such as a newly created reference model. While a primary use of the invention is to encode a reference model to meet a selected size budget, the size, quality and resolution adjustments can be applied to any model or set of images. The source model typically comprises of a collection of three dimensional geometry, topology, and textures. It is stored in any format that supports this sort of data, such as VRML, 3DS, and the like. In a preferred embodiment, the source model is initially in the HyperSpace model format, a known proprietary storage format of Kaon Interactive, Inc., for three dimensional models. Once the source model is read, it is loaded into memory and stored in various Java classes. Of course, other storage formats could be used depending upon the programming language which is used. The portion of the image data that represents the texture is stored in any standard image format such as JPG, GIF, TIFF, and the like. In a preferred embodiment, the texture images are stored in the JPG format, and are included with the HyperSpace model.

Figure 2:
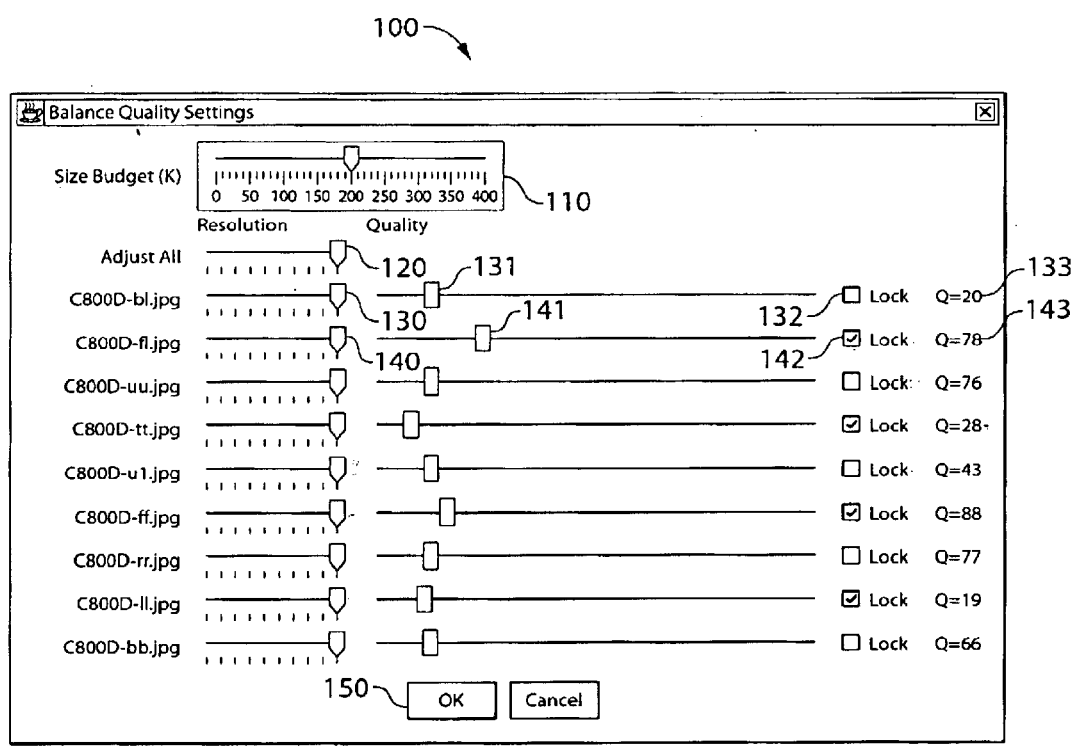
FIG. 2 illustrates a user interface for the first embodiment of the present invention.

After the stored model has been read, the next step 15 is to set a size budget for the model. The size budget could be selected in various manners. FIG. 2 illustrates a first embodiment of a user interface 100 for use with the present invention. The user interface 100 includes a size budget slider 110. The user can manipulate the slider, such as clicking on it with a mouse-controlled pointer, to select a size budget. Alternatively, the user interface could allow direct entry of a number representing the size budget or it could provide the user with a range of sizes from which to choose. In any embodiment, the system could have a default value for the size budget, such as 250K, if no value is selected by the user.

After the size budget has been determined, the next step 20 is determining the total number of pixels of image data. At this step, the number of pixels is determined by the current size of all of the images in the model. The number of pixels of image data is the sum of the width times the height of all texture images used in the model. If, for example, the model used one image which is 1000×1000, and another which is 500×600, the number of pixels would be 1.3 million. Of course, other procedures could be used for determining the number of pixels depending upon the manner in which the images are stored. Once the total number of pixels has been calculated at step 20, the number of bits per pixel that would yield the target size budget is determined at step 25. The number of bits per pixel is calculated by dividing the budget by the number of pixels. For example, if the budget is 100 Kbytes, then the pixels in the previous example would have roughly 0.615 bits per pixel (100 Kbytes*8000 bits/Kbyte/1,300,000 pixels) available.

Once a number of bits per pixel are determined, a quality setting estimate is determined for each of the images at step 30. The quality setting is determined so that the target number of bits per pixel for each unique image in the source model is achieved. The relationship between bits per pixel and the quality setting depends upon the encoding scheme which is used. Some encoding schemes, such as the JPEG 2000 wavelet encoding scheme, include bits per pixel as an input. Thus, the result of the step 25 can be used as the estimate of the quality setting. For other types of encoding schemes, the system utilizes a technique that translates the desired bits per pixel to a quality setting. By way of example, the raw image data is first compressed using a default quality setting, such as 80 in a JPEG standard. Performing the compression allows a determination of the number of bits per pixel for the images at the selected quality setting. A table of sample values comprised of data reflecting the relative change in file size for a particular quality setting is stored in the system. For example, if a quality setting of 85 is used instead of 80, the file size will increase by approximately 16%. The information in the table is then used to translate from the bits per pixel determined using the default quality setting to another quality setting which meets the target bits per pixel as determined at step 25 The quality setting determine from the table can be used as the quality setting in step 35. Alternatively, since a quality setting does not directly translate into a number of bits per pixel, an iterative process can be used. Once a new quality setting has been selected using the table, the raw data can be compressed again using the new quality setting. The table can be used again to make further adjustments if the target bits per pixel has not yet been achieved.

After a quality setting has been determined, the current settings are displayed to the user at step 35. The user interface 100 of FIG. 2 includes information on quality 133, 143 for each image. At step 35, during the first iteration, all of the quality settings are identical. At this point, the user can manipulate various parts of the user interface 100 to change the values which go into determining the quality settings. As part of this process, the system may render the three dimensional image based upon the current quality settings so that the user can determine the appearance. The user interface of FIG. 2 includes controls for changing the various settings used in the model. Thus, the user could change the size budget by moving the slider 110. Alternatively, the user can adjust the total number of pixels used to create the new model from the source model, i.e. the image resolution. The resolution could be adjusted for all images, using slider 120, or separately for each of the images, using separate sliders 120, 140. In a preferred embodiment, the default setting for the total number of pixels (or scale used to reduce the size of the source model to the final model) is 100%. The user can then reduce that value by moving the appropriate sliders 120, 130, 140. Of course, other values, such as 50% could be used as the default. Additionally, the default values could be dynamic based upon the size of the source image. Thus, a lower default value may be used when a model includes a large amount of image data.

As illustrated in FIG. 2, controls are present for each image in the model, so that each image can be manipulated independently. This allows higher quality settings and resolutions to be used for more significant images and lower quality settings and resolutions to be used with less significant images. A change in the size budget, as determined at step 40, results in the process returning to step 15. Steps 20–35 are then repeated based upon the new size budget, whether increased or decreased, in order to select appropriate quality settings. A change in the resolution, as determined at step 45, results in the process returning to step 20. Since the resolution determines the number of pixels in the images, the quality settings need to be determined again using the changed number of pixels.

When the user adjusts the scale of a texture image, the total number of pixels that must be saved for that image is changed. Moreover, the target bits per pixel are affected by this change. However, other data relating to the model does not have to be changed. The manner in which textured three dimensional models are stored is generally independent of the actual size of the images used as texture. Coordinate values for those images, variously known in the art as "texture coordinates," "UV coordinates," or "ST coordinates," are generally given in a normalized 0 to 1 range, where 0 is at one edge of the image, 1 is at the opposite edge, and 0.5 is halfway between. Therefore, the compression algorithm described above could scale the image to a different resolution without having to change any other data.

As illustrated in FIG. 2, the user interface includes a quality slider 131, 141 and "lock" selector 132, 142 for each texture image. These controls allow the user to make specific adjustments directly to the quality settings for individual texture images, as determined by step 50 in FIG. 1. If the user selects the "lock in" 132, 142 for an image, the quality setting for that image is no longer changed by the system. This locking in feature has the effect of changing the bits per pixel available for the remaining images. In order to accommodate this change, an algorithm could be used to automatically adjust the quality settings of each remaining image to achieve the overall size budget. Additionally, the quality setting sliders 131, 141 are used to select specific quality settings for certain images. The sliders are moved automatically by the system to the appropriate setting as determined by step 30. The user can then increase or decrease the quality setting for each image. Once the user locks in a setting, that setting will not change when other settings are changed by the system. However, a user may manually change a setting, by moving the slider, even though the lock checkbox has been selected. Additionally, a change in one quality setting will result in modification of the quality settings for the other images which have not been locked. The locked image or images are eliminated from the determination of the number of bits per pixel (step 25) and the estimate of quality settings (step 26) upon continuation of the process. By way of example, the system performs the following steps in redetermining the number of pixels and quality settings once an image has been adjusted or locked:

1. Determine the total number of bits in the size budget.
2. Subtract the total number of bits currently being used, given current quality settings, to determine how "over" or "under" the budget the system is.
3. Determine the total number of texels which are not due to images that have their quality locked in.
4. Divide the number of bits over/under budget by these available texels, to determine the over/under amount in bits per texel.
5. Distribute this over/under amount equally to each image which does not have a bits per pixel value locked in.
6. Re-estimate the JPEG quality settings which should yield these new bits per pixel values.

Once the user has determined that no additional adjustments to the settings will be made, he or she accepts the current settings at step 55 by selecting the OK button 150 on the user interface 100. At this point, the system performs the image scaling and encoding (step 60) necessary to produce the final model given the quality settings set by the user. In a preferred embodiment, image scaling and encoding algorithms are obtained from reusable language libraries. For example, the scaling could be performed by the Java Graphics2D class, and the image encoding could be performed by the JPEGImageEncoder class in the Java package com.sun.image.codec.jpeg.

Once the image scaling and encoding have been performed, the resulting images are written to a storage device (step 65). The storing step may also include storing the quality settings as adjusted by the user. An image saving algorithm writes images using quality settings to control file size. This algorithm takes into account the desired quality of the output image when it saves the image. As a result, an image compression is performed resulting in losses of quality from the original image to the saved image. When this step is performed on a file stored in the JPEG format, quality is simply a metric between 1 and 100. In this metric, a low value produces a smaller file with less fidelity in the image appearance. Contrastingly, a high value produces a larger file with more fidelity in the image's appearance. The JPEGImageEncoder class in the Java package com.sun.image.codec.jpeg could be used to perform this step.

Figure 3:
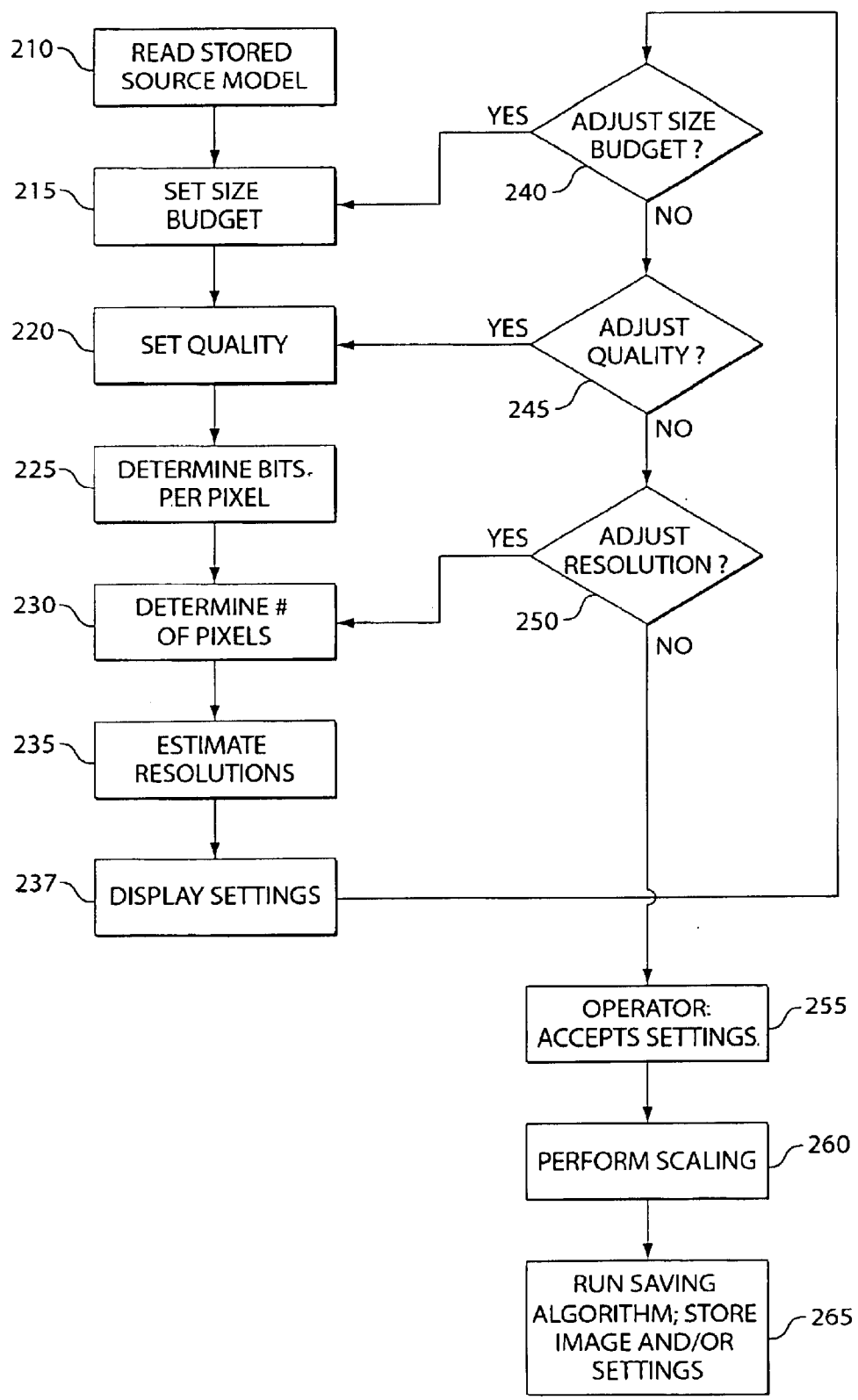
FIG. 3 illustrates a block flow diagram of operation of a second embodiment of the present invention.
Figure 4:
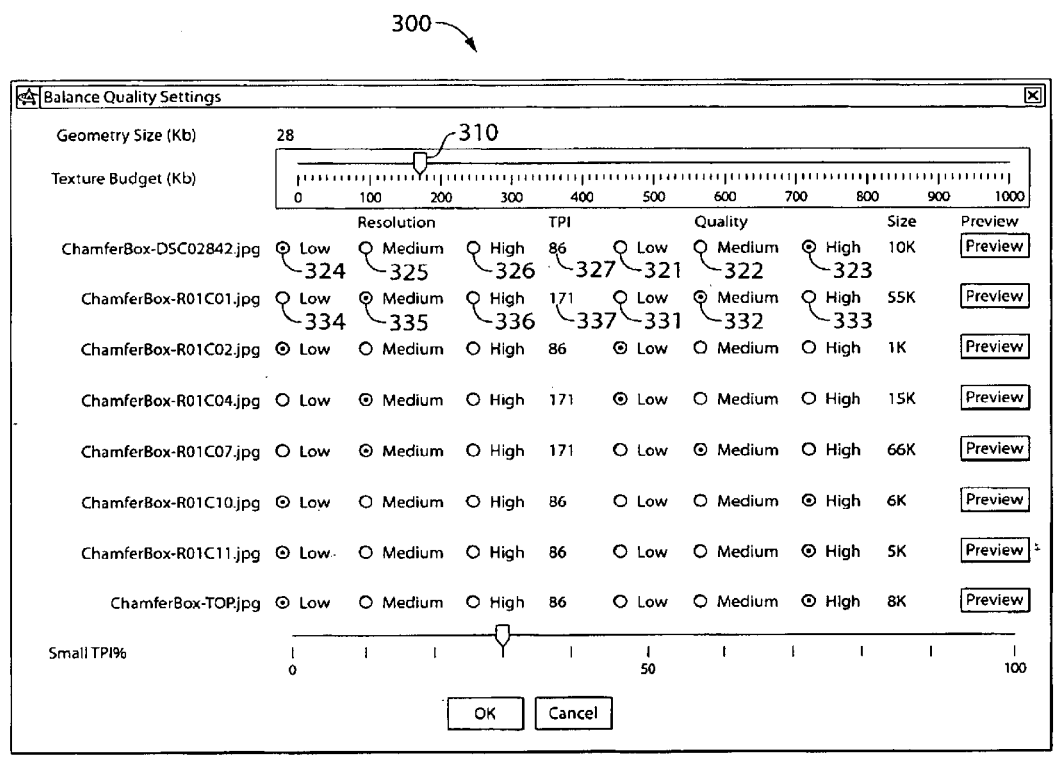
FIG. 4 illustrates a user interface for the second embodiment of the present invention.

The file size of a model is based upon the resolution and quality applied to each of the texture images. In the above described embodiment, the system automatically determines quality settings based upon the user's selection of a budget size and resolutions. In a second embodiment, corresponding to FIGS. 3 and 4, the system automatically determines resolution settings based upon a user's selections of quality. FIG. 3 is a block flow diagram for the process of the second embodiment. FIG. 4 is an exemplary user interface for the system of the second embodiment.

As in the first embodiment, the first steps 210, 215 in the second embodiment are to read the stored source model and to set the size budget. The size budget is set using the slider 310 in the user interface 300, as illustrated in FIG. 4. After the budget is set, the system determines quality settings based upon default values at step 220. The default values may be the same for all of the images or may be different depending upon various criteria with respect to the images, such as image size. The quality settings are represented on the user interface 300 as certain level settings corresponding to each image. As illustrated in FIG. 4, according to a preferred embodiment, the quality settings are selected as Low, Medium or High. These relative values may relate to specific quality settings, such as 35, 50 and 65 under JPEG standards. In a preferred embodiment, the default values for the quality settings are all Medium. At step 225, the system determines a number of bits per pixel based upon the quality settings for the images. As noted above, a quality setting generally relates to a specific bits per pixel value. At step 230, the system determines the number of pixels for the model. In a preferred embodiment, the total number of pixels within the size budget is determined by dividing the size budget by the bits per pixel. At step 235, the resolutions for the images are estimated. In a preferred embodiment the resolutions are determined by dividing the number of pixels from step 230 by the total number of pixels all of the images of the model. The resolutions are set and displayed 328, 338 on the user interface, at step 237. As in the first embodiment, the revised model may be rendered and displayed for review by the user As in the first embodiment, the user can use the user interface 300 to adjust the values relating to the model to optimize the size and appearance of the model. In particular, according to a preferred embodiment, the user can change the budget size at step 240 or the quality settings at step 245.

If the user changes the budget size, then the system returns to step 215 repeats the steps for determining the resolutions. If the user changes the quality settings for one or more images, then new resolutions need to be determined. However, if different images have different quality settings, the system cannot merely use a set number of bits per pixel. The effect on the change in quality on the numbers of bits per pixel will depend upon the relative sizes of the images. Steps 230 and 235 are then performed based upon the new number of bits available for each image and the applicable quality setting. Thus, the system maintains information relating to the number of bits, bits per pixel and number of pixels for each image separately in order to make appropriate adjustments.

As illustrated in FIG. 4, the user may also select a relative resolution level 324, 325, 326 and lock in 327 a resolution value for each image. The resolution level selection process, performed at step 250, recognizes that in addition to quality changes, the user may desire different resolutions for different textures in a model. The user can select Low, Medium or High for the resolution levels. In a preferred embodiment, these levels correspond to relative values 0.25, 0.5 and 1.0. Of course, other relative values could also be used. When the resolution adjustments are made, the system redetermines resolutions for all of the images.

In particular, according to a preferred embodiment, the steps for redetermining the resolutions are:

1. Determine the initial number of pixels allocated for each image by multiplying the number of pixels at the image's original resolution by the resolution scale factor specified by the user;

2. Determine the number of bytes required to store each image at the current quality and resolution settings; this can be done either by actually encoding the image in the target file format, or by estimating the number of bytes using the table lookup method described above;

3. Determine the total number of bytes required to store all the textures by adding together the number of bytes required for storing each image at the current quality and resolution settings;

4. Divide the current total number of bytes required to store all the textures at the current quality and resolution settings by the number of bytes in the budget; this gives the over the budget ratio;

5. Change the number of pixels allocated to each image according to the over the budget ratio; if this ratio is above 1, the total number of pixels needs to be reduced; if this ratio is less than 1, then the total number of pixels can be increased, but not so much as to exceed the number of pixels required to store the original image, at full resolution; the amount of change in the number of pixels can be determined based on the compression technique used to encode the images and can be estimated using the table lookup method explained above, or can be determined in another way; in the second illustrative embodiment, the change in the number of pixels is determined as the square of the over the budget ratio;

6. Repeat steps 2 through 5 until a satisfactory outcome is reached. In a preferred embodiment, satisfactory, outcome can be determined as total number of bytes meeting the budget exactly or to within a certain tolerance value. In a preferred embodiment, the iterations are also interrupted in the special case when all the images fit under the specified budget when stored at their original resolutions. In the second illustrative embodiment, steps 2 through 5 are repeated exactly 5 times, which usually leads to the total required number of bytes being sufficiently close to the budget.

As in the first embodiment, the resolutions can be lock using a check box 327, 337 corresponding to each image. Any further changes to quality settings or resolution levels do not change the resolution of any images which is locked. Those images, including the numbers of pixels and numbers of bits used, are simply ignored in the resolution determining process.

Once the user is satisfied with the settings, the process continues as in the first embodiment. The user accepts the current settings at step 255 by selecting the OK button 350 on the user interface 300. At this point, the system performs the image scaling and encoding (step 260) necessary to produce the final model given the quality settings set by the user. Once the image scaling and encoding have been performed, the resulting images are written to a storage device (step 265).

Having thus described at least one embodiment of the present invention, adaptations and modifications, in addition to those explicitly mentioned herein, will be readily apparent to those of ordinary skill in the art. Such adaptations and modifications are to be considered part of the present invention, which is only limited by the claims appended hereto.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method for selecting quality and resolution settings for texture images forming part of a three dimensional model, the method comprising the steps of:

retrieving a source model including a plurality texture images;

setting a size budget for the texture images;

selecting a plurality of resolution settings, each resolution setting corresponding to one of the plurality of texture images; and determining a quality setting for each of the texture images based upon the size budget, the plurality of resolution settings, and a size of each of the texture images.

2. The method for selecting quality and resolution settings for texture images forming part of a three dimensional model according to claim 1, wherein the determining step includes the steps of:

determining a total number of pixels in the plurality of texture images;

determining a target number of bits per pixel based upon the size budget and the total number of pixels; and determining quality settings based upon the target number of bits per pixel.

3. The method for selecting quality and resolution settings for texture images forming part of a three dimensional model according to claim 1, further comprising the steps of:

changing at least one of the plurality of resolution settings; and determining a new quality setting for each of the texture images based upon the change of at least one of the plurality of resolution settings.

4. The method for selecting quality and resolution settings for texture images forming part of a three dimensional model according to claim 3, further comprising, before the changing step, the step of selecting a quality setting for at least one of the plurality of texture images; and wherein the step of determining a new quality setting includes the step of retaining the quality setting for the selected at least one of the plurality of textures.

5. A method for selecting quality and resolution settings for texture images forming part of a three dimensional model, the method comprising the steps of:

retrieving a source model including a plurality texture images;

setting a size budget for the texture images;

selecting a plurality of quality settings, each quality setting corresponding to one of the plurality of texture images; and determining a resolution setting for each of the texture images based upon the size budget, the plurality of quality settings, and a size of each of the texture images.

6. The method for selecting quality and resolution settings for texture images forming part of a three dimensional model according to claim 5, wherein the determining step includes the steps of:

determining a number of bits per pixel based upon the plurality of quality settings;

determining a number of pixels based upon the number of bits per pixel and the size budget; and determining resolution settings based upon the number of pixels.

7. The method for selecting quality and resolution settings for texture images forming part of a three dimensional model according to claim 5, further comprising the steps of:

changing at least one of the plurality of quality settings; and determining a new resolution setting for each of the texture images based upon the change of at least one of the plurality of quality settings.

8. The method for selecting quality and resolution settings for texture images forming part of a three dimensional model according to claim 7, further comprising, before the changing step, the step of selecting a resolution setting for at least one of the plurality of texture images; and wherein the step of determining a new resolution setting includes the step of retaining the resolution setting for the selected at least one of the plurality of textures.

9. A system for determining quality and resolution settings for texture images forming part of a three dimensional model comprising: a user interface, including means for selecting a size budget;

means for selecting resolution values; and means for selecting quality values; and means for determining quality and resolution settings based upon the selected size budget, the selected resolution values; and the selected quality values.

10. The system for determining quality and resolution settings for texture images forming part of a three dimensional model according to claim 9, further comprising:

means for rendering the three dimensional model based upon the determined quality and resolution settings.

11. The system for determining quality and resolution settings for texture images forming part of a three dimensional model according to claim 9, wherein the user interface includes means for changing at least one of the resolution values and the quality values; and wherein the system includes means for determining quality and resolution settings based upon changed at least one of the resolution values and the quality values.

* * * * *